(12) United States Patent
Yamane et al.

(10) Patent No.: US 7,092,900 B2
(45) Date of Patent: Aug. 15, 2006

(54) ELECTRONIC COMMERCE METHOD, RECORDING MEDIUM STORING ELECTRONIC COMMERCE PROGRAM THEREIN, AND SERVER

(75) Inventors: Takashi Yamane, Kawasaki (JP); Tetsuya Fujisawa, Kawasaki (JP); Seiji Kawaguchi, Kawasaki (JP); Masashi Ohnishi, Kawasaki (JP); Hiroya Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 751 days.

(21) Appl. No.: 09/800,890

(22) Filed: Mar. 8, 2001

(65) Prior Publication Data

US 2002/0065733 A1 May 30, 2002

(30) Foreign Application Priority Data

Nov. 30, 2000  (JP) ............................. 2000-364287

(51) Int. Cl.
  *G06Q 30/00* (2006.01)
  *G06F 7/00* (2006.01)
(52) U.S. Cl. ............................. 705/26; 705/1; 705/27; 705/14; 707/5; 707/104.1
(58) Field of Classification Search ................ 705/14, 705/26, 27; 713/168; 707/5, 104.1; 380/239
  See application file for complete search history.

(56) References Cited

U.S. PATENT DOCUMENTS

| | | | | |
|---|---|---|---|---|
| 6,011,758 A | * | 1/2000 | Dockes et al. ........... 707/104.1 |
| 6,233,682 B1 | * | 5/2001 | Fritsch ....................... 713/168 |
| 6,317,722 B1 | * | 11/2001 | Jacobi et al. ................. 705/14 |
| 6,334,127 B1 | * | 12/2001 | Bieganski et al. ............. 707/5 |
| 6,834,110 B1 | * | 12/2004 | Marconcini et al. ........ 380/239 |
| 2001/0025259 A1 | * | 9/2001 | Rouchon ..................... 705/26 |
| 2002/0023015 A1 | * | 2/2002 | Hughes et al. ................ 705/26 |

FOREIGN PATENT DOCUMENTS

| | | |
|---|---|---|
| JP | 10-55399 | 2/1998 |
| JP | 11-120693 | 4/1999 |
| JP | 11-202855 | 7/1999 |
| JP | 2000-32413 | 1/2000 |

OTHER PUBLICATIONS

Gracenote ( Press release, "Gracenote Digital Top"—First to Accurately chart global listening trends; Oct. 12, 2000 extracted from the Gracenote Website on Internet on Jan. 23, 2005).*

(Continued)

*Primary Examiner*—Yogesh C. Garg

(74) *Attorney, Agent, or Firm*—Staas & Halsey LLP

(57) ABSTRACT

A server performs electronic commerce with a client by using a network. An order receiving unit of the server separates a sales article into information and goods and presents them as an ordering target to the client. An article providing unit of the server selects the separated information, separated goods, or a combination thereof on the basis of an ordering request from the client and provides it to the client. The article providing unit executes a time difference service for providing the separated goods after the separated information was precedently provided. The article providing unit provides a separation service for solely providing the separated information and the separated goods, respectively.

12 Claims, 17 Drawing Sheets

OTHER PUBLICATIONS

Gillespie Nick; "Cutting out the middlemen"; Reason; Los Angeles; Aug./Sep. 2000; vol. 32; Iss: 4; 2 pages, extracted on Internet from Proquest database.*

U.S. Appl. No. 60/198,202 which is the parent of US Publication: 20020023015 (Note: This can be viewed on USPTO Home site hence copy not enclosed).*

* cited by examiner

FIG.1 PRIOR ART

| SERVICE FORM | | OPERATING COMPANY | FEATURES OF NEW SERVICES | |
|---|---|---|---|---|
| EXISTING SERVICES | (OVER-THE COUNTER SALES OF CD) | (MANY) | | △ TRANSACTION OF GOODS |
| | SALES BY EC | MANY | | |
| | MUSIC DISTRIBUTION BY INTERNET | MANY | | △ TRANSACTION OF INFORMATION |
| | (RENTAL CD) | (MANY) | | |
| NEWLY APPEARING SERVICES | MUSIC POD | V-SYNC | • EXTRACT INFORMATION FROM HOST SERVER VIA OPTICAL FIBER BY ON-DEMAND IN A REAL-TIME MANNER<br>• DIGITALLY PRINT WORD CARD AS A STICKER | △ TRANSACTION OF INFORMATION |
| | MUSICDELI | MEDIA RAG | • STORE DIGITAL CONTENTS VIA SATELLITE INTO HARD DISK OF TERMINAL<br>• PRINT WORD CARD AS A RECEIPT | |
| | DIGITAL CONTENTS (DIGICUBE) | DIGICUBE | • STORE DIGITAL CONTENTS INTO HARD DISK OF TERMINAL VIA SATELLITE<br>• DIGITALLY PRINT JACKET AND WORD CARD | |

F I G. 1 3

| ITEM | DETAILS | USER SELECTION ITEM |
|---|---|---|
| USE ENVIRONMENT | DURING COMMUTING | ○ |
| | DURING DRIVING | |
| | SPARE TIME AT HOME | |
| | DURING WORK | |
| | OTHERS | |
| DESIRED MUSIC | THE LATEST SONG | |
| | JAPANESE POPS | ○ |
| | ENKA | |
| | FOREIGN POPS | ○ |
| | JAZZ | |
| | CLASSICAL MUSIC | |
| | HEALING BGM | |
| | OTHERS | |

F I G. 1 4

74

| USER ID | USE ENVIRONMENT | DESIRED MUSIC | |
|---|---|---|---|
| aaaa | DURING COMMUTING | JAPANESE POPS | FOREIGN POPS |

| USE FORM | USE FREQUENCY | STORING TIME |
|---|---|---|
| DURING COMMUTING | SMALL | SMALL |
| DURING DRIVING | SMALL | SMALL |
| SPARE TIME AT HOME | LARGE | LARGE |
| DURING WORK | SMALL | LARGE |
| OTHERS | | |

FIG. 17

| FIELD NO. | PROVIDING FORM |
|---|---|
| A | ONLY INFORMATION |
| B | SEPARATION OF INFORMATION AND CD |
| C | ONLY CD |
| D | ONLY CD |

FIG.18

| MUSIC PIECE GENRE | CLASSIFICATION OF INFORMATION | USE FREQUENCY | STORING TIME | FIELD NO. | PROVIDING FORM | STORAGE OF USE FORM |
|---|---|---|---|---|---|---|
| THE LATEST SONG | DISPOSABLE | SMALL | SHORT | A | ONLY INFORMATION | CA,CB,CC,CD |
| JAPANESE POPS | REPEATABLE | LARGE | LONG | A | ONLY INFORMATION | CA,CB,CC,CD |
| ENKA | REPEATABLE | LARGE | LONG | B | CD / INFORMATION | CA,CB,CC,CD |
| CHILDREN'S SONG | REPEATABLE | SMALL | LONG | C | ONLY CD | CA,CB,CC,CD |
| FOREIGN POPS | REPEATABLE | LARGE | SHORT | B | INFORMATION / CD | CA,CB,CC,CD |
| JAZZ | REPEATABLE | LARGE | LONG | D | ONLY CD | CA,CB,CC,CD |
| CLASSICAL MUSIC | REPEATABLE | LARGE | LONG | D | ONLY CD | CA,CB,CC,CD |
| HEALING BGM | REPEATABLE | SMALL | LONG | C | ONLY CD | CA,CB,CC,CD |
| SINGLE | DISPOSABLE | SMALL | SHORT | A | ONLY INFORMATION | CA,CB,CC,CD |
| ALBUM | REPEATABLE | LARGE | LONG | B | CD / INFORMATION | CA,CB,CC,CD |

ELECTRONIC COMMERCE METHOD, RECORDING MEDIUM STORING ELECTRONIC COMMERCE PROGRAM THEREIN, AND SERVER

BACKGROUND OF THE INVENTION

1. Field of the Invention

The invention relates to an electronic commerce method of performing electronic commerce (EC) with a client by a server by using a network, a recording medium in which an electronic commerce program has been stored, and a server. More particularly, the invention relates to an electronic commerce method whereby sales articles can be divided into information and goods and presented, a recording medium in which an electronic commerce program has been stored, and a server.

2. Description of the Related Arts

In recent years, a scale of market of electronic commerce has been largely increasing and there are a variety of articles (segments) in a range from an article of a low price such as groceries or the like to an article of a high price such as a real estate or the like. The articles which are actually being dealt with can be mainly classified into goods and information. A transaction of "goods" used here denotes a general transaction such that physical articles are delivered through distribution of books, CDs, and the like. A transaction of "information", on the other hand, denotes a transaction such that information such as software or music distribution is delivered by being downloaded through the Internet. It should be noted here that the electronic commerce of each of "goods" and "information" is solely executed. When a transaction in the music world in Japan is actually considered as a specific example, it is known that such a transaction becomes as shown in FIG. 1. It will be summarized as follows.

(I) Goods such as CD and the like are purchased (sales of goods).

(II) Music piece data is downloaded to a terminal or the like of a personal computer (sales of information).

(III) Music piece data is copied to an MD or the like at a Kiosk terminal in a convenience store or the like (sales of information).

(IV) A jacket or a word card can be also printed out on the ground by electronic distribution by a dedicated terminal installed in a shop or the like (sales of information).

As mentioned above, any of the sales forms is a solo-transaction of "information" or "goods".

Although the market of package articles by an over-the-counter sales or the like is stable, a business ratio in the electronic commerce is small and it is considered that the prospects for the remarkable increase in market scale in the future is not good in the present situation. For example, in the music distribution, it is presumed that a market scale of the electronic commerce will be equal to at most about 20% in the whole music market and the markets of a package and the others will occupy the major part (examination result of the Nikkei Net Business in 2000).

SUMMARY OF THE INVENTION

According to the invention, an electronic commerce method which can raise a ratio of electronic commerce to a general transaction such as an over-the-counter sales, a recording medium in which an electronic commerce program has been stored, and a server are provided.

According to the invention, there is provided an electronic commerce method of performing electronic commerce with the client by a server by using a network, comprising: an order receiving step (function of an order receiving unit of a server) which separates sales articles into information and goods and presents them to the client in a form such that they can be selected; and an article providing step (function of an article providing unit of the server) which selects the separated information, separated goods, or a combination thereof on the basis of an ordering request from the client and provides them to the client. In the article providing step, a time difference service for providing the separated goods after the separated information was precedently provided is performed. In the article providing step, a separation service for solely providing the separated information and the separated goods is performed. For example, in the case where an article which is sold by the electronic commerce method of the invention is a packaged recording medium for music, that is, a CD for music, in the order receiving step, the packaged recording medium for music is separated into recorded music piece data, a package, music, and the recording medium itself and presented. In the article providing step, the packaged recording medium for music, music piece data, a medium casing, music, a CD medium, or an article providing form of a combination thereof is selected and provided to the client.

The inventors of the present invention earnestly examined factors of the presumption such that the market scale of the electronic commerce of, for example, music distribution or the like in Japan is equal to at most about 20% in the whole music market and the markets of the package and the others occupy the major part, and performed the following analysis. First, information as purchase articles which are provided to the consumer can be mainly classified into two kinds of information such as disposable information and collection information. The disposable information is information which is processed in a short time and hardly repetitively used. On the other hand, the collection information is information which is intended to store to a certain extent and often repetitively used. The positional relation between the disposable information and the collection information can be clarified by a two-dimensional coordinate space in which a use frequency U and a storing time T are set to scales. The use frequency denotes the number of listening times such that the user repetitively listens to information of a purchased music CD or the like for a certain predetermined period of time. The storing time is a time during which information is held until the user does not listen to purchased music CD or the like but disposes of it. In the 2-dimensional coordinate space, the disposable information shows a tendency to make information and the collection information shows a tendency to make goods. From the positional relation in the 2-dimensional coordinate space, the music distribution or online shopping which is at present being performed is located at both extremes such as disposable information and collection information and a wide blank portion exists between them. The inventors of the present invention judged that the factors by which the market of the electronic commerce business of the music world is not enlarged as compared with the current over-the-counter sales and rental shops exist in such a blank portion and made the present invention. The invention, therefore, provides an electronic commerce method whereby by properly combining information and goods, a blank portion of the 2-dimensional coordinate space in which the use frequency U and storing time T are set to scales is embedded. That is, according to the electronic commerce method of the invention, each of the goods and the information is solely added to a transaction and a combination of the goods and the information is provided to the consumer in a form such that they can be selected, thereby raising purchase will of the consumer by taking advantages of the information and the goods.

According to the electronic commerce method of the invention, if a sales article is a book, in the order receiving step, the book is separated into book data recorded in the book, the book itself, and a book casing and presented. In the article providing step, the book data, the book itself, the book casing, or a combination thereof is selected and provided to the client. According to the electronic commerce method of the invention, if the sales article is a packaged recording medium for video images, for example, a video tape or a DVD, in the order receiving step, the article is separated into a packaged recording medium for video images, recorded video data, a medium casing, and the recording medium itself and presented. In the article providing step, the packaged recording medium for a video image, recorded video data, medium casing, recording medium itself, or a combination thereof is selected and provided to the client. Naturally, the other articles are also similarly processed.

Further, according to the electronic commerce method of the invention, there is provided a providing form analyzing step (function of a providing form analyzing unit of a server machine) which obtains a use frequency and a storing time of an article as a target to be ordered and sets a providing form. The providing form analyzing step has the following four patterns.

(I) In the case where the use frequency of an article is low and the storing time is also short, a providing form of only the information (making of information) is set.
(II) In the case where the use frequency of the article is high and the storing time is also long, a providing form of the article itself (making of goods) is set.
(III) In the case where the use frequency of the article is high and the storing time is short, a providing form of a combination of the information and goods is set.
(IV) In the case where the use frequency of the article is low but the storing time is long, a providing form of a combination of the information and goods or a providing form of the article itself is set.

The providing form set in the providing form analyzing step as mentioned above is presented as a default providing form which is recommended to the client in the order receiving step. Therefore, when the user selects the article to be ordered on the client, the recommended providing form in the case where the article which was automatically judged on the server side to be optimum is separated into the information and goods is shown to the user, so that the user can easily select the optimum providing form in which the article was separated into the information and goods. In the providing form analyzing step, a use frequency and a storing time for the article ordered by the client are obtained with reference to a database of user information in which a use environment, a taste, and the like have previously been registered. Therefore, the user can know the optimum providing form adapted to himself. In the providing form analyzing step, a use frequency and a storing time for the article ordered by the client are obtained by referring to a database in which attributes of the sales article, for example, in case of a music CD, a use frequency and a storing time have previously been registered in correspondence to a music piece genre or the like. The user can receive a service according to the statistical providing form.

The invention also provides a computer-readable recording medium in which an electronic commerce program has been recorded, wherein the electronic commerce program allows a computer constructing a server to execute: an order receiving step which separates a sales article into information and goods and presents them to the client in a form such that they can be selected; and an article providing step which selects the separated information, the separated goods, or a combination thereof on the basis of an ordering request from the client and provides it to the client.

The above and other objects, features, and advantages of the present invention will become more apparent from the following detailed description with reference to the drawings.

BRIEF DESCRIPTION OF THE DRAWINGS

FIG. 1 is a list explanatory diagram of commerce in the music world;

FIG. 13 is an explanatory diagram of user questionnaire information which is used for a providing form analysis in FIG. 4;

FIG. 14 is an explanatory diagram of user information formed from the user questionnaire information in FIG. 13;

FIG. 17 is an explanatory diagram of a correspondence table of a field number and a providing form based on FIG. 16;

FIG. 18 is an explanatory diagram of providing form information which is used for the providing form analysis in FIG. 4.

DETAILED DESCRIPTION OF THE PREFERRED EMBODIMENT

Figure 2:
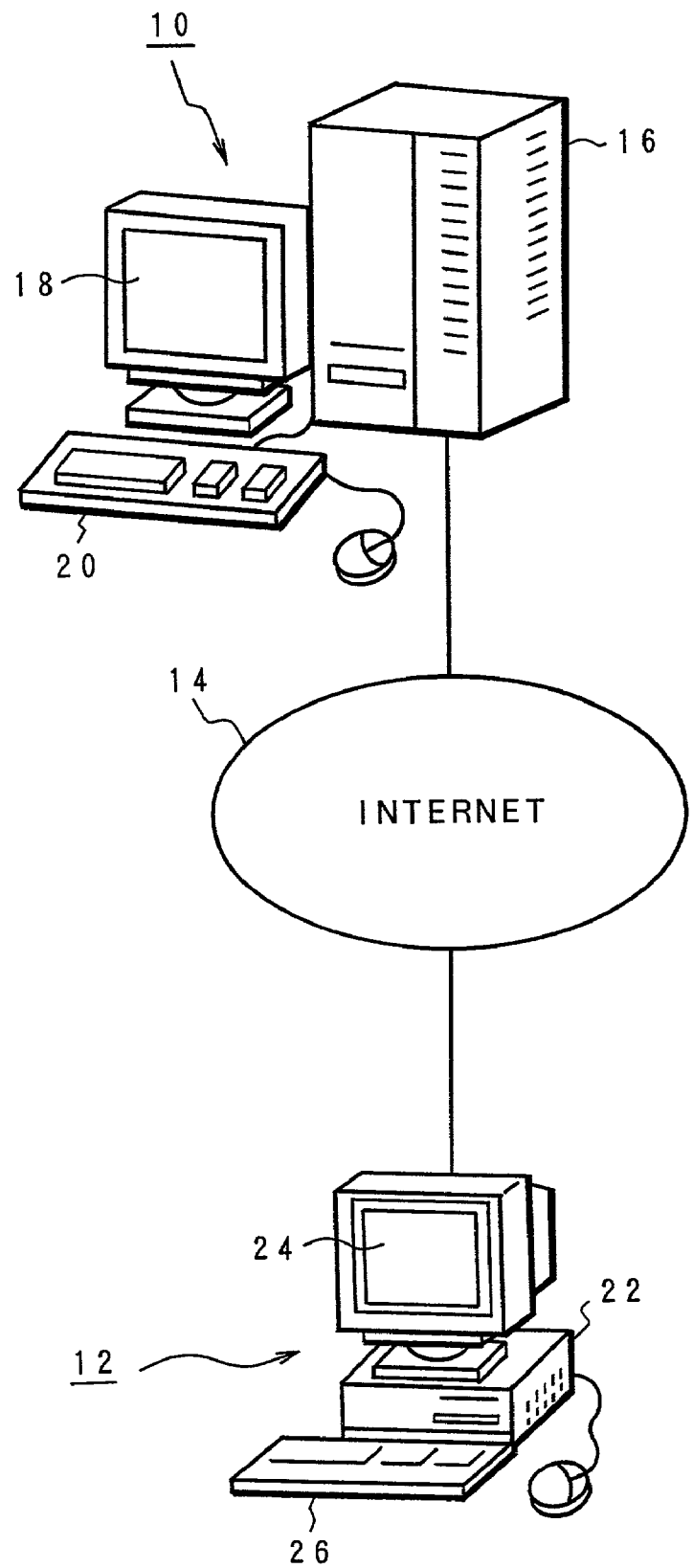
FIG. 2 is an explanatory diagram of a network system for performing electronic commerce of the invention.

FIG. 2 is an explanatory diagram of a network system for realizing electronic commerce according to the invention. A server machine 10 is a computer system for establishing a virtual shop of the electronic commerce according to the invention and comprises: a main body 16; a display unit 18 using a color display; and an operation unit 20 having a keyboard and a mouse. A client machine 12 is connected through an Internet 14 to the server machine 10 which establishes the virtual shop. The client machine 12 is a computer system of the user who uses the virtual shop of the server machine 10 and comprises: a main body 22; a display unit 24 using a color display; and an operation unit 26 having a keyboard and a mouse.

Figure 3:
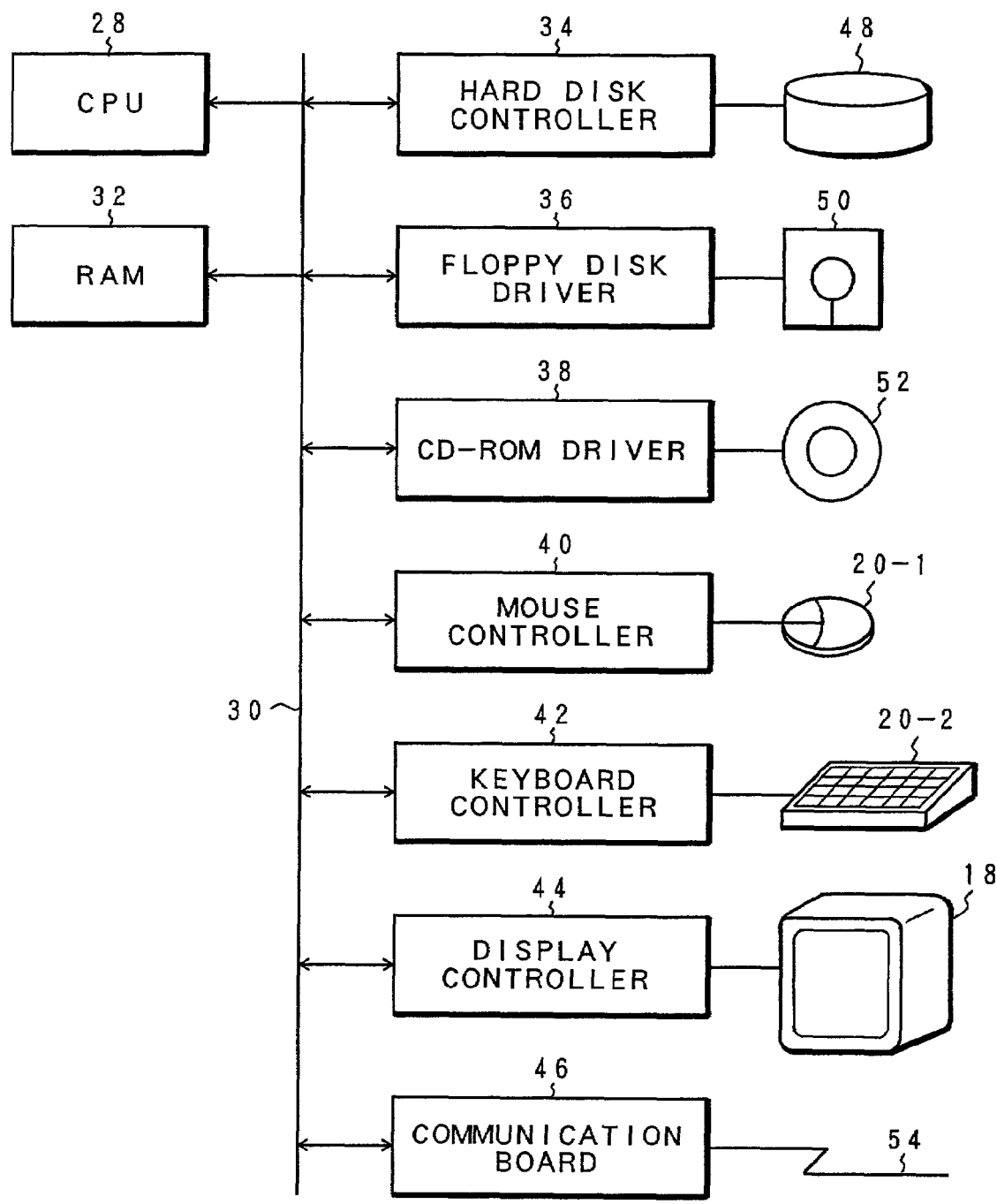
FIG. 3 is a hardware constructional diagram of a server machine in FIG. 2.

FIG. 3 shows an example of a hardware construction of the server machine 10 in the network system of FIG. 2. Fundamentally, the client machine 12 also has the same construction as that of the server machine. An RAM 32, a hard disk controller 34, a floppy disk driver 36, a CD-ROM driver 38, a mouse controller 40, a keyboard controller 42, a display controller 44, and a communication board 46 are connected to a bus 30 of a CPU 28. A hard disk drive 48 is connected to the hard disk controller 34 and an electronic commerce program of the invention has been loaded in the hard disk drive 48. Upon activation of the server machine, the hard disk controller reads out the electronic commerce program from the hard disk drive 48, develops it onto the RAM 32, and allows the CPU 28 to execute it. A floppy disk drive 50 is connected to the floppy disk driver 36 and the writing and reading operations to/from a floppy disk can be performed. A CD driver 52 is connected to the CD-ROM driver 38 and data or a program stored in a CD can be read. The mouse controller 40 notifies the CPU 28 of the input operation of a mouse 20-1. The keyboard controller 42 notifies the CPU 28 of the input operation of a keyboard 20-2. The display controller 44 allows the display unit 18 to display. The communication board 46 performs communication with the client through a communication line 54 via the Internet 14.

Figure 4:
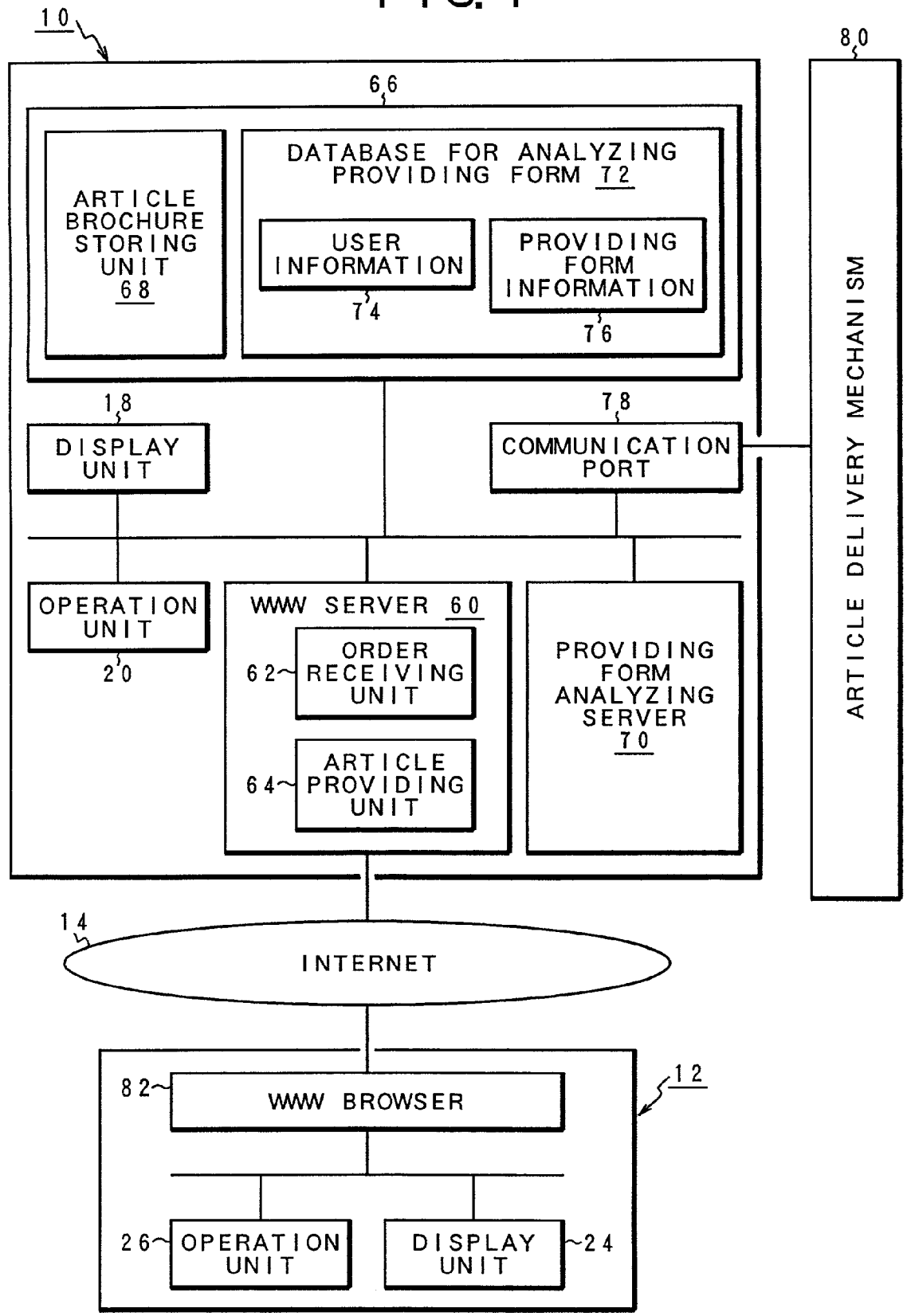
FIG. 4 is a block diagram of a function construction of a server which executes the electronic commerce of the invention and a client.

FIG. 4 is a block diagram showing a function construction of the server machine for performing electronic commerce with the client by using the network. A WWW server 60 and a providing form analyzing server 70 are provided for the server machine 10 which functions as a virtual shop in the electronic commerce. An article brochure storing unit 68 and a database 72 for analyzing a providing form are provided for a memory 66 which is realized by the RAM 32 in FIG. 3. User information 74 and providing form information 76 have been stored in the database 72 for analyzing a providing form. Further, the display unit 18 using the display in FIG. 3 and the operation unit 20 having the keyboard, mouse, and the like are provided for the server machine 10. Moreover, an article delivery mechanism 80 established as an external system is connected to the server machine 10 through a communication port 78. The WWW server 60 is realized by installing the electronic commerce program according to the invention and has functions of an order receiving unit 62 and an article providing unit 64. The order receiving unit 62 separates an article which is sold at the virtual shop established by the server machine 10 into information and goods and presents them in a form such that they can be selected, specifically speaking, as an ordering picture plane to the client machine 12 side. On the basis of an ordering request from the client machine 12, the article providing unit 64 provides an article to the user of the client machine 12 in accordance with a form of the sole separated information, the sole separated goods, or further, a combination of the goods and the information. In the invention, a time difference service and a separation service are provided as services of the electronic commerce which are provided to the user by the article providing unit 64. According to the time difference service, an article is separated into information and goods, the separated information is precedently provided, and thereafter, the separated goods are provided. According to the separation service, an article is separated into information and goods and they are solely provided, respectively. Further, the server machine 10 of the invention enables the user to select one of a transaction of the sole goods, a transaction of the sole information, and further, a transaction of a combination of the goods and information which are provided by the WWW server 60. However, the providing form analyzing server 70 for presenting which providing form is optimum as default information to the user is provided for the server machine 10. The providing form analyzing server 70 refers to the user information 74 in the providing form analyzing database 72 provided in the memory 66 or the providing form information 76 corresponding to the sales article and presents a providing form, as default setting information, that is desirable for the user, that is, information indicative of the sole goods, the sole information, or a combination of the goods and the information. The process for analyzing the providing form executes an analysis based on two items such as use frequency and storing time as basic analysis items in the electronic commerce of the invention. The client machine 12 connected to the server machine 10 through the Internet 14 has: a WWW browser 82; the operation unit 26 having the keyboard and mouse in FIG. 3; and the display unit 24 using the color display or the like. By accessing to a homepage of the server machine 10 which provides the electronic commerce, the WWW browser 82 receives and displays various transaction picture planes which are necessary for the electronic commerce, and executes the operations which are necessary for the various electronic commerce such as selection and ordering of articles corresponding to the display picture planes, setting of user information, and the like.

Figure 5:
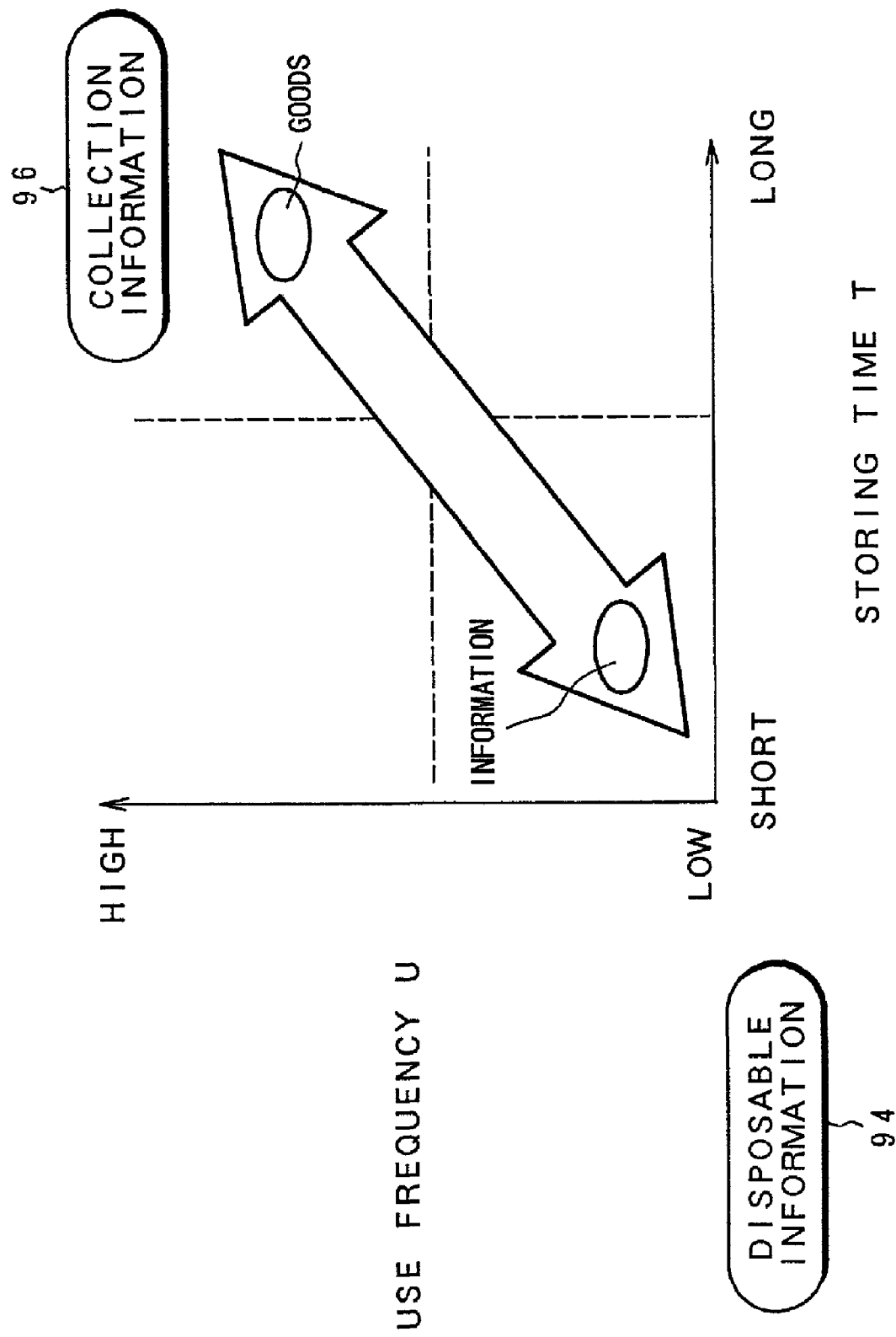
FIG. 5 is an explanatory diagram of the positional relation between information and goods in a two-dimensional coordinate space of a storing time and a use frequency.

In the electronic commerce of the invention, an explanation will now be made with respect to a study of the inventors of the present invention by which they could establish a concept that in addition to a form such that a sales article is separated into goods and information and each of the goods and the information is solely provided, a form of a combination of goods and information is provided. FIG. 5 shows the positional relation between the information and the goods in a two-dimensional space of a storing time and a use frequency in an article which is sold in the electronic commerce of the invention. According to the study of the inventors of the present invention, in the electronic commerce such as ordinary sales form, music distribution, and the like, if the purchase articles as information which is provided to the consumer have been arranged, the information is mainly classified into disposable information and collection information. The disposable information and collection information can be expressed as positions in a 2-dimensional coordinate space of the use frequency U and storing time T. That is, disposable information 94 is information which is disposed in a short time and whose repetition use frequency is low and exists at a position in the coordinate space where the use frequency U is low and the storing time T is short. On the other hand, collection information 96 is information such that it is an object to be stored to a certain extent and the repetition use frequency is high, so that it is positioned into the 2-dimensional coordinate space as information in which the use frequency U is high and storing time T is long. The disposable information 94 has a tendency to make information. The collection information 96 has a tendency to make goods. That is, in the 2-dimensional coordinate space, as the coordinate position which is determined by the use frequency U and storing time T approaches in the left oblique lower direction, the tendency to make information is enhanced. As it approaches in the right oblique upper direction, the tendency to make goods is enhanced.

Figure 6:
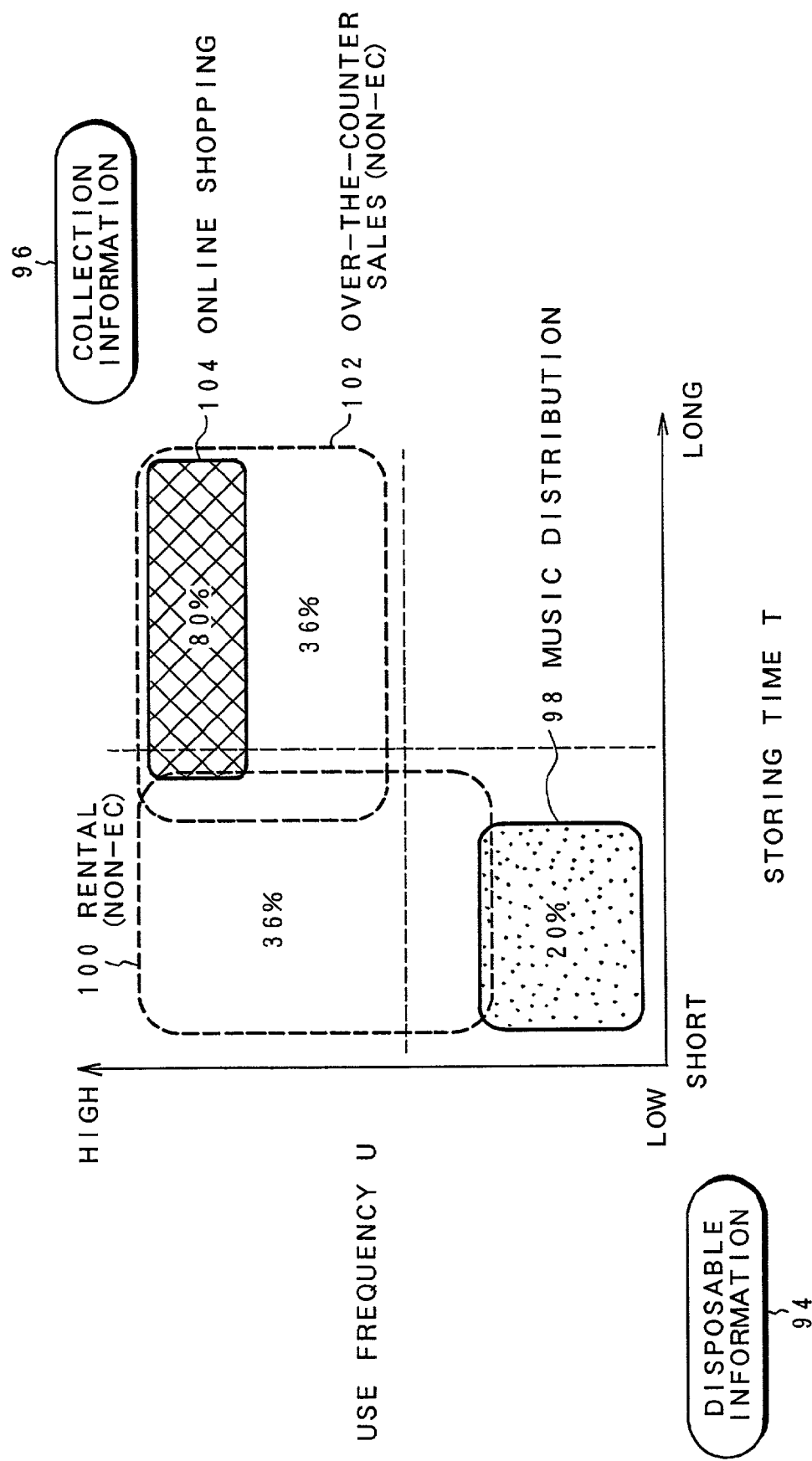
FIG. 6 is an explanatory diagram of a sales form in the existing music world.

FIG. 6 shows the positional relation between the ordinary over-the-counter sales and the rental and between the music distribution and the online shopping which are performed in the electronic commerce with respect to the music market as an example with regard to the use frequency U and storing time T in FIG. 5. A ratio of the market is expressed by a size of area. First, in music distribution 98 as a main stream of the electronic commerce, since it is a transaction of only information, it is located on the disposable information 94 side in which the use frequency U is low and the storing time T is short. At present, its ratio is equal to at most about 20%. In an online shopping 104 as the same electronic commerce, since the use frequency U is high and the storing time T is long, the online shopping is located on the collection information 96 side and its market ratio is equal to 8%. On the other hand, in a rental 100 as an ordinary transaction instead of the electronic commerce, since the use frequency U is relatively high and it is not the goods to be stored, the storing time T is short and the rental is located at the position of the same storing time T as that of the disposable information 94. However, the use frequency U is located in a region near the collection information 96 and its market ratio is equal to 36%. In an ordinary over-the-counter sales 102 which is not the electronic commerce, it is perfectly a transaction of sole goods, and since the use frequency U is high and the storing time T is long, the over-the-counter sales is located on the collection information 96 side in a manner similar to the case of the online shopping 104 and its market ratio is equal to 36%. When observing the positional relation of the sales forms of the music market in the 2-dimensional coordinate space, it will be understood that the music distribution 98 and online shopping 104 as electronic commerce are located at both extremes of the disposable information 94 and collection information 96 and that a space between them is embedded by the rental 100 and over-the-counter sales 102 which are not the electronic commerce. The inventors of the present invention, therefore, establishes a form of new electronic commerce which embeds the space between the music distribution 98 and online shopping 104 as electronic commerce in the coordinate space, thereby improving the market ratio in the electronic commerce. For this purpose, according to the inventors of the present invention, an article which is sold by the electronic commerce is separated into goods and information. There is formed a transaction such that in addition to the transaction of the sole goods and the transaction of the sole information, the goods and the information are newly combined and provided to the user in a form such that they can be selected.

Figure 7:
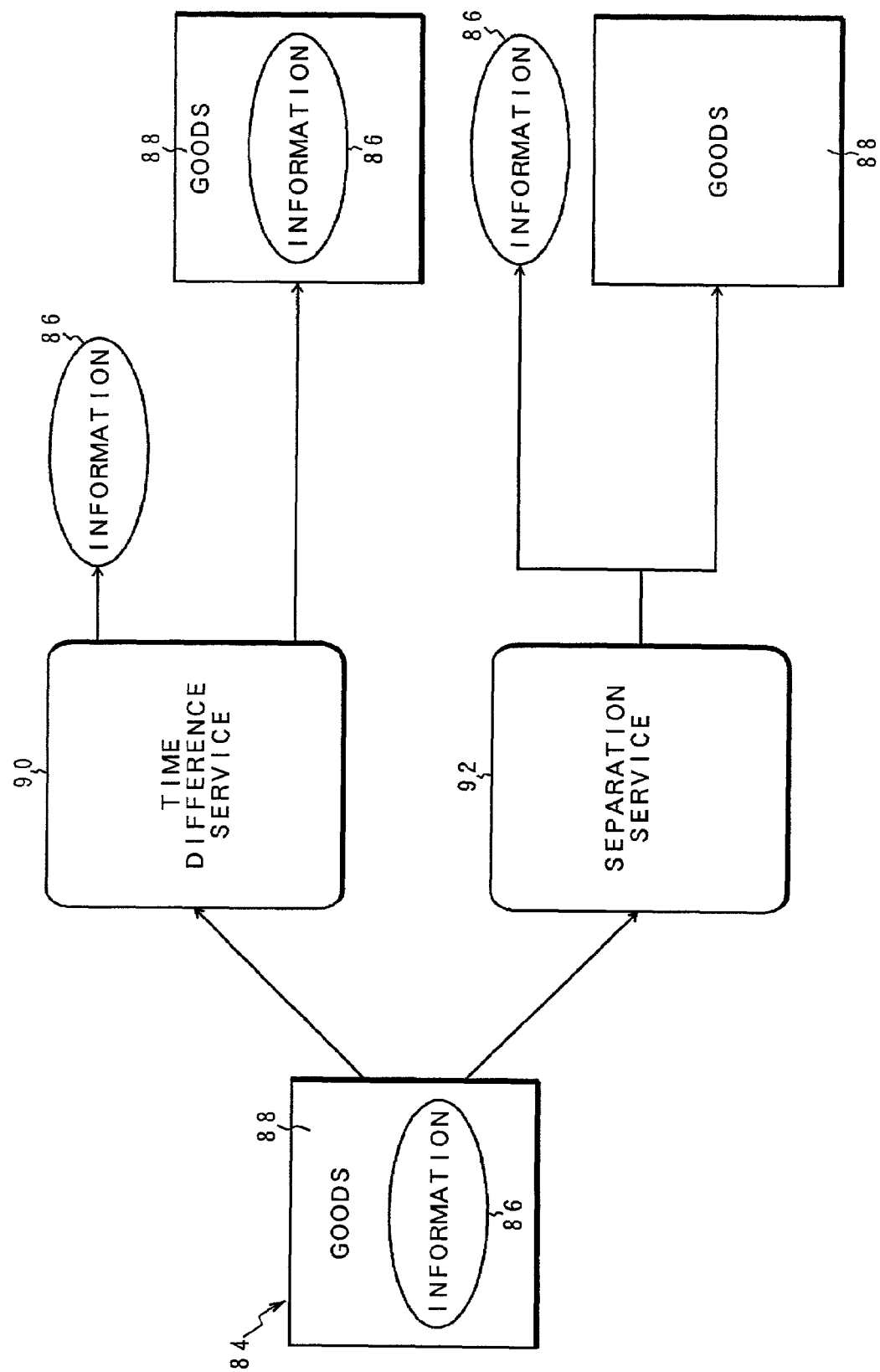
FIG. 7 is an explanatory diagram of a time difference service and a separation service in the invention.

FIG. 7 is an explanatory diagram of the time difference service and separation service which are realized by the electronic commerce of the invention. An article 84 which is sold by the electronic commerce is constructed by information 86 and goods 88. For example, when considering a music CD as an article 84, the information 86 is music piece data and the goods 88 are a jacket or casing, a word card, and a CD. According to the invention, such an article 84 is separated into the information 86 and goods 88 and provided, specifically speaking, a time difference service 90 and a separation service 92 are provided. The time difference service 90 is a service such that a time lag which is caused until the user actually receives a delivered article after he ordered the article is eliminated by precedently providing only toll information. For example, in case of book sales of books, magazines, or the like, it is a mechanism such that electronic data is downloaded at an ordering time point and an actual book is obtained later. That is, the time difference service 90 is a mechanism for allowing the user to obtain the article 84 after the information 86 was precedently provided. The separation service 92 is a mechanism such that an article in which information and goods have inherently been combined is purposely separated into the information and the goods and they are individually provided to the user. For example, in case of a music CD, it is a mechanism such that music piece data is provided by music distribution or the like and, thereafter, a jacket and a word card are provided or the music CD is solely sold. That is, the separation service 92 is a mechanism such that the article 84 is separated into the information 86 and goods 88 and provided. With respect to the goods 88 constructing the article 84, for example, there is a case where they are constructed by a plurality of items such as jacket, word card, casing, and CD like a music CD. In this case, one or an arbitrary combination of a plurality of items with respect to the goods is provided to the user in a form such that they can be selected.

Figure 8:
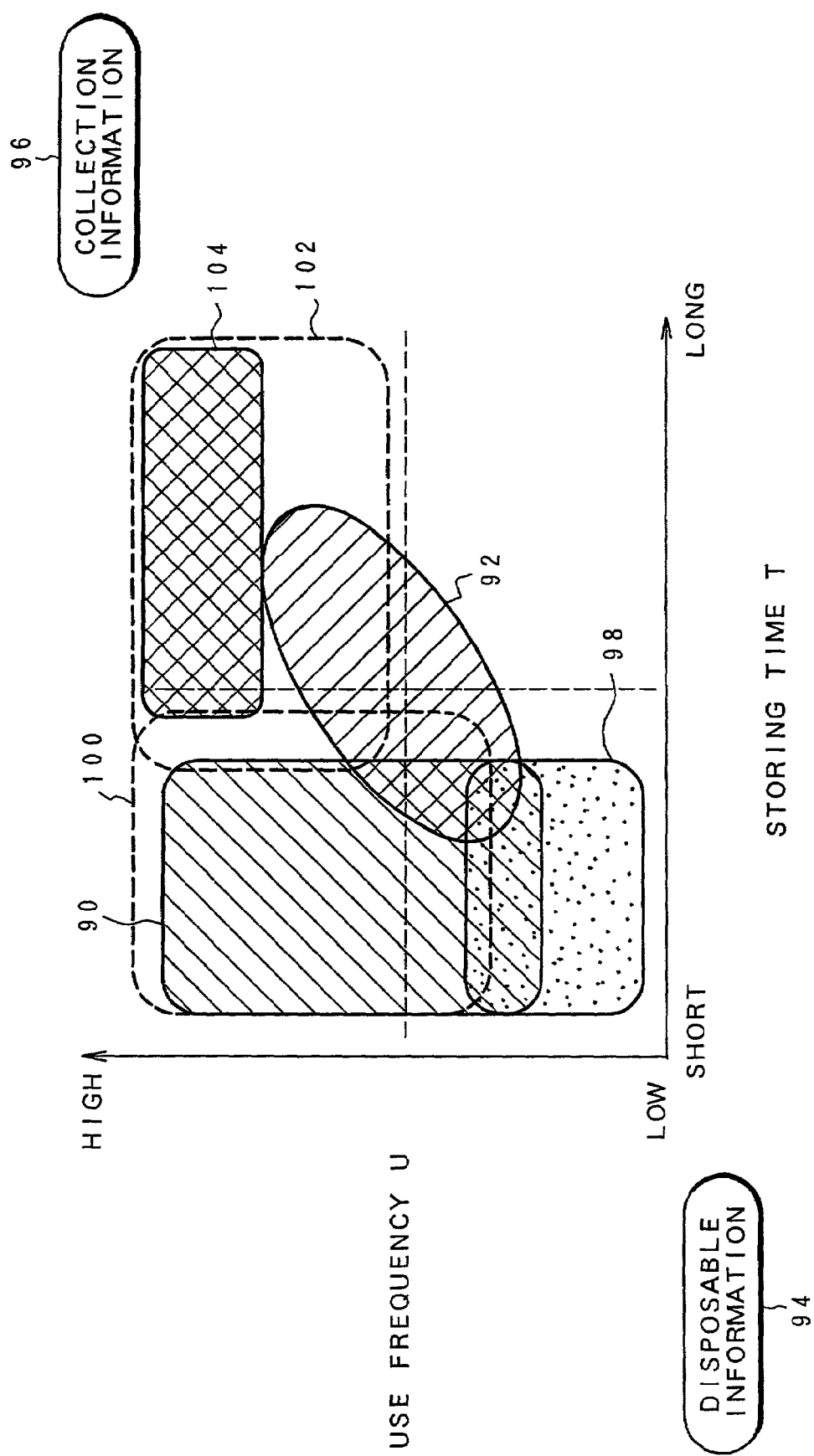
FIG. 8 is an explanatory diagram of a sales form in which the time difference service and separation service of the invention have been added.

By providing the time difference service 90 and separation service 92 as new electronic commerce as shown in FIG. 7, the space between the existing music distribution 98 and online shopping 104 is embedded by the time difference service 90 and separation service 92 as shown in FIG. 8. By establishing such a transaction form of the new electronic commerce by the present invention, it is possible to expect the remarkable improvement of the market ratio of the electronic commerce.

Figure 9:
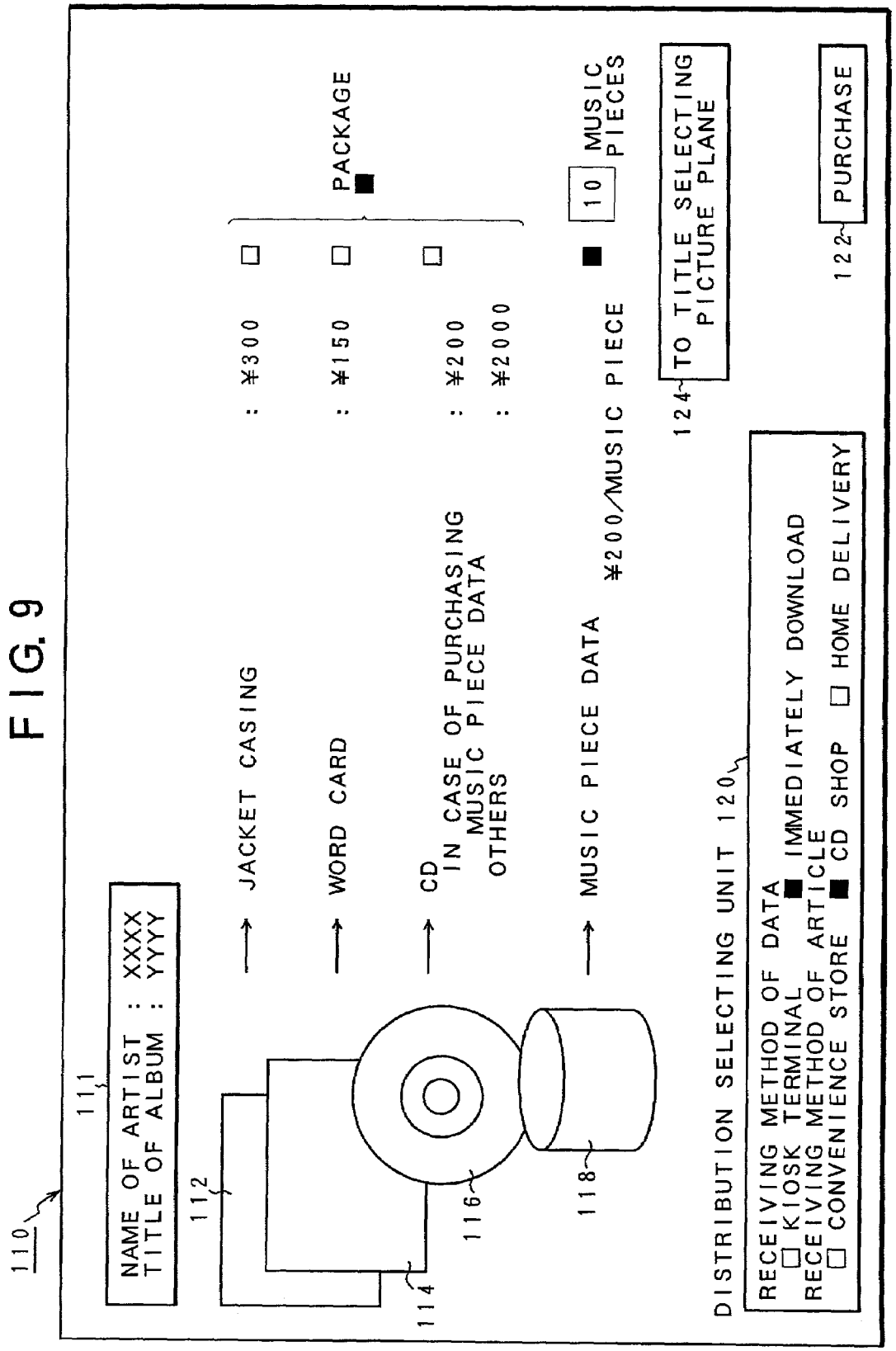
FIG. 9 is an explanatory diagram of a user presenting picture plane which is used in the electronic commerce of the invention in the music distribution.

FIG. 9 shows an ordering picture plane in the case where the electronic commerce of the invention is provided to the music distribution by the server machine 10 in FIG. 4 and relates to a music CD as a sales article. When the user obtains an article brochure of music CDs from the WWW server 60 of the server machine 10 by using the WWW browser 82 of the client machine 12 in FIG. 4 and selects the music CD to be purchased, a CD ordering picture plane 110 is displayed on the display unit 24 of the client machine 12 owing to the function of the order receiving unit 62 provided for the WWW server 60 of the server machine 10. In the CD ordering picture plane 110, a title 111 is shown at the upper left corner, a jacket 112, a word card 114, and a CD 116 are shown as items constructing the music CD under the title 111, and music piece data 118 is further shown as information. In correspondence to the goods and information which were graphics displayed, the name of the goods, the name of the information and, further, check boxes for performing an order setting with respect to each of them are displayed on the right side as shown by arrows. With respect to the combination of the goods, a check box as a CD package is provided. As for the music piece data, the number of selected music pieces can be displayed simultaneously with the check box. Music pieces in the music piece data can be selected by shifting a screen to a title selecting picture plane by operating a title select key 124. A distribution selecting unit 120 is provided in a lower portion of the CD ordering picture plane 110. The distribution selecting unit 120 is provided separately for each of the information and the goods. In this example, as a "receiving method of data", for instance, "Kiosk terminal" and "immediately download" are displayed. As for the goods, as a "receiving method of article", a convenience store, a CD shop, or a home delivery can be selected. The user who received such a presentation of the CD ordering picture plane 110 can properly select and combine the goods which are necessary for himself and purchase them. For example, as for the music piece data, if he wants to immediately obtain, it is sufficient to click the check box of the music piece data, select the music piece titles, and click "immediately download" with respect to the distribution selecting unit 120. If the user wants to obtain the same music CD as that in the ordinary over-the-counter sales after he downloaded the music piece data, it is sufficient to click the check box of the CD package. As a fee in this case, for example, a purchase money amount of ¥2200 in total is charged. That is, since the downloaded music piece data is 10 music pieces, a fee in this case is set to ¥2000 and in case of the CD package, since it relates to the case of the purchase of music piece data, a fee is set to ¥200, so that the total fee is equal to ¥2200. Naturally, only the jacket casing and word card can be purchased with respect to the goods. As for the music piece data, since there is no need to select all music pieces of the music CD and only the desired music pieces can be selected. Therefore, when the user selects desired music pieces and purchases the CD as goods, he can purchase a music CD corresponding to the original CD of his own composition instead of the music CD itself.

Figure 10:
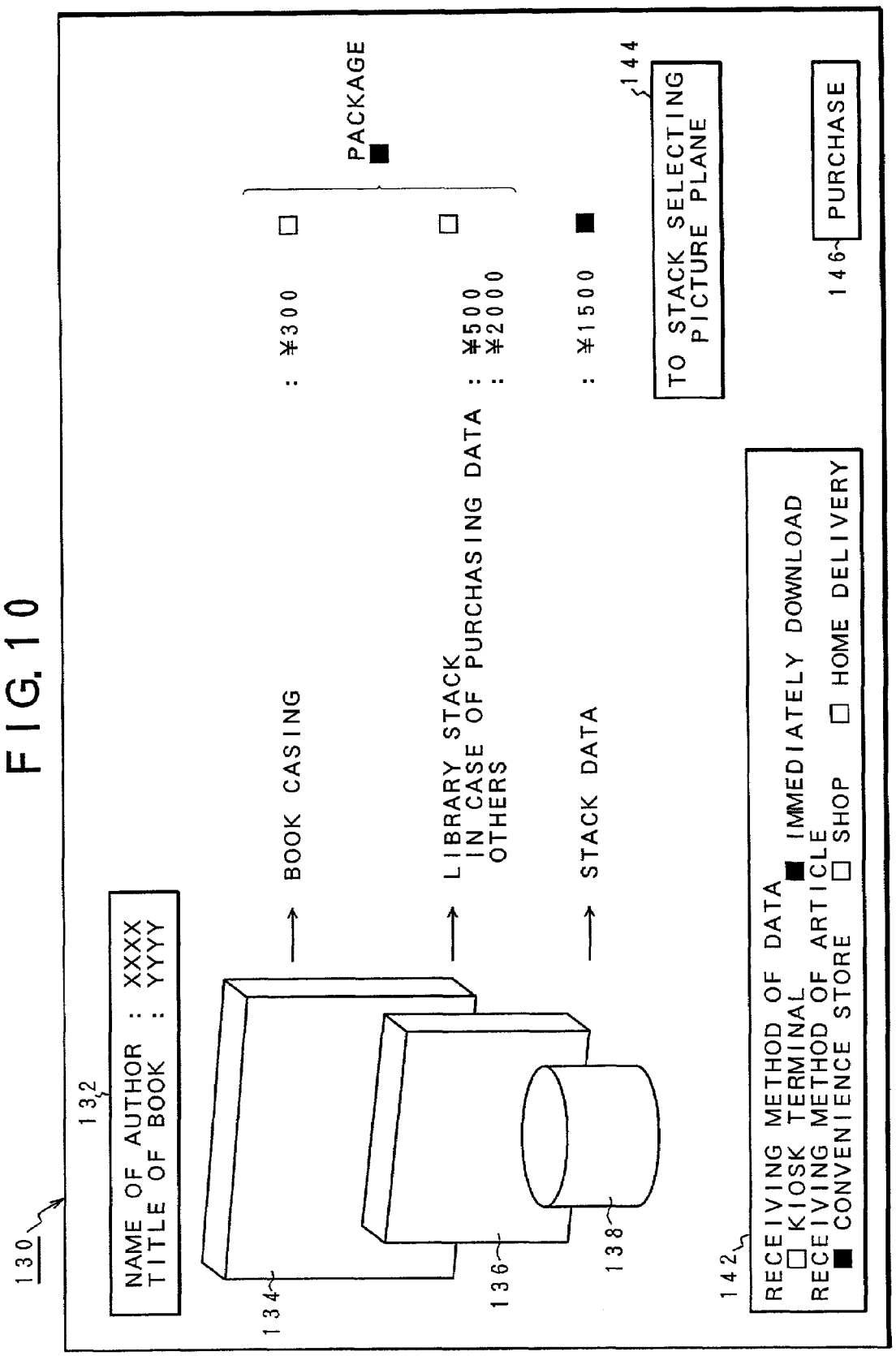
FIG. 10 is an explanatory diagram of a user presenting picture plane which is used in the electronic commerce of the invention in the book distribution.

FIG. 10 shows a book ordering picture plane which is presented to the user by the electronic commerce according to the invention. A book ordering picture plane 130 is divided into a title 132, a book casing 134, a library stack 136, and stack data 138. A price is set into each of them. One of them can be solely purchased or a combination of them can be purchased by the check boxes. In a distribution selecting unit 142, a "receiving method of data" or a "receiving method of article" can be selected. In the library stack 136, the screen can be shifted to a stack selecting picture plane by a stack select key 144. A purchase key 146 is further provided. In this case, the user clicks the stack data 138 and can receive the book by downloading. After that, the user receives the book itself as a package at the convenience store. Naturally, with respect to the goods, it is possible to divide them into the book casing and the library stack and purchase it solely.

Figure 11:
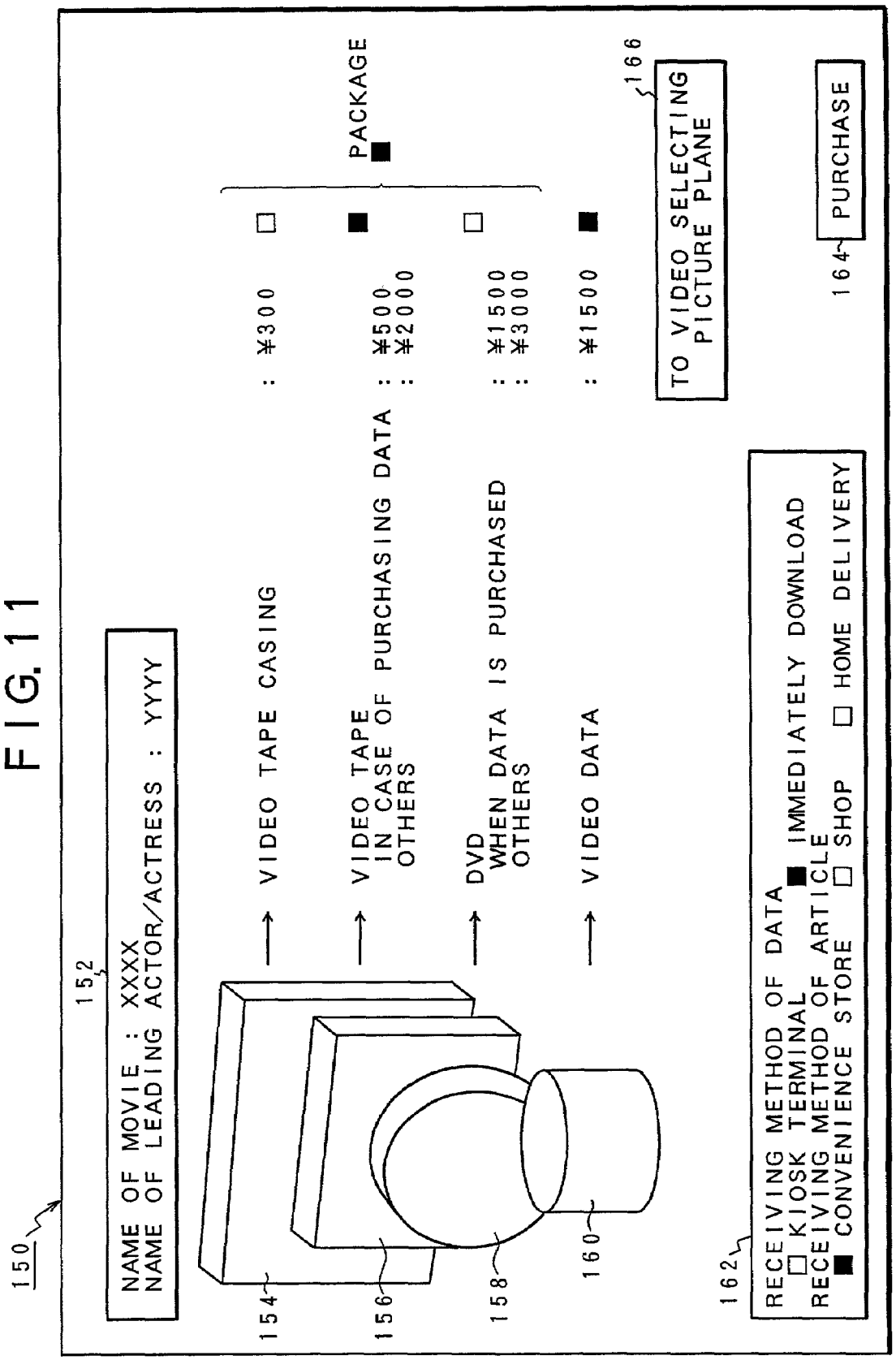
FIG. 11 is an explanatory diagram of a user presenting picture plane which is used in the electronic commerce of the invention in the video distribution.

FIG. 11 is an explanatory diagram of a video ordering picture plane which is provided to the user in the electronic commerce of the invention. As for a video ordering picture plane 150, subsequent to a title 152, goods of a video tape casing 154, a video tape 156, and a DVD 158 are shown by a graphics display. Subsequently, video data 160 as information is shown as a purchase form. In the example, the video data 160 is downloaded first and the package is received at the convenience store. In this case, since the video tape has been selected, a price of ¥2000 including ¥1500 as video data and ¥500 as a video tape is charged in total. If the user determines the purchase selection, it is sufficient to press a purchase key 164. If the user wants to order another video tape, the screen can be returned to the brochure picture plane by pressing a video select key 166. As mentioned above, although the ordering picture planes of the music CD, book, and video tape have been shown in FIGS. 9 to 11 as examples, if a sales article can be separated into information and goods as another example, a combination of the goods and the information can be provided to the user in a form such that they can be selected.

Figure 12:
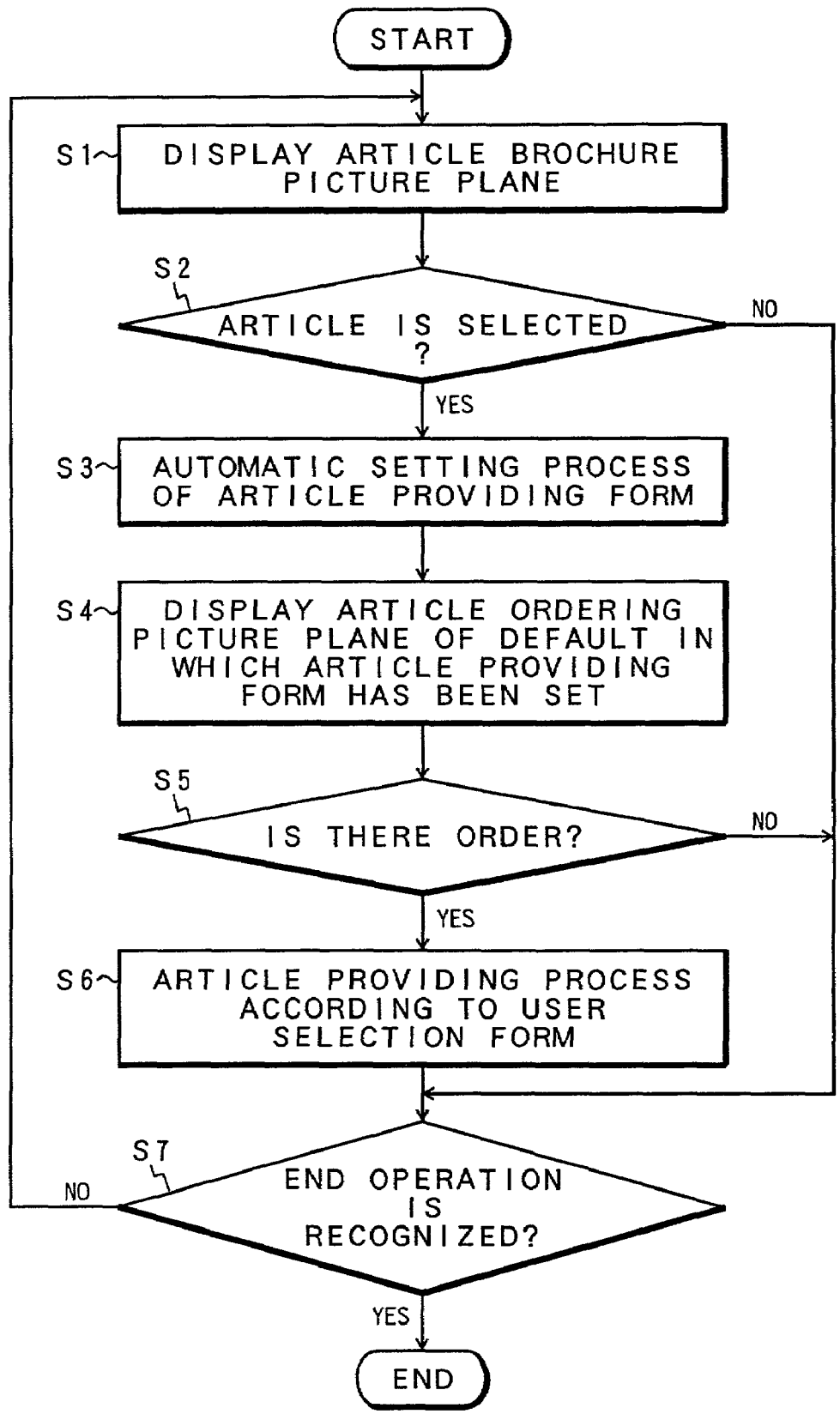
FIG. 12 is a flowchart for the electronic commerce according to the invention.

FIG. 12 is a flowchart for electronic commerce of the invention by the WWW server 60 in FIG. 4. First, in step S1, an article brochure picture plane in the electronic commerce is displayed in response to an access from the client machine 12. For the brochure picture plane, if there is an article selection from the client machine 12 in step S2, an optimum combination of goods and information corresponding to the article selected by the user is obtained from the use frequency and the storing time by a process of the providing form analyzing server 70 in step S3. A default article ordering picture plane in which the article providing form as an optimum combination of the goods and the information has been set is presented to the client machine 12 in step S4. The automatic setting process of the article providing form by the providing form analyzing server 70 in step S3 will be clearly described hereinlater. By the process in step S4, for example, the ordering picture planes as shown in FIGS. 9 to 11 are displayed to the user by the client machine 12. On the basis of the article ordering picture planes, when an order is received from the client machine 12 in step S5, an article providing process according to the user selection form is performed in step S6. That is, if the information is purchased, the data is downloaded into the client machine 12 through the Internet 14. At the same time, if there is an order for the goods, an instruction regarding a delivery of the goods accepted by the order is issued to the external article delivery mechanism 80 in an online manner. When the end operation is recognized in step S7, a series of processes is finished.

Figures 15, 16:
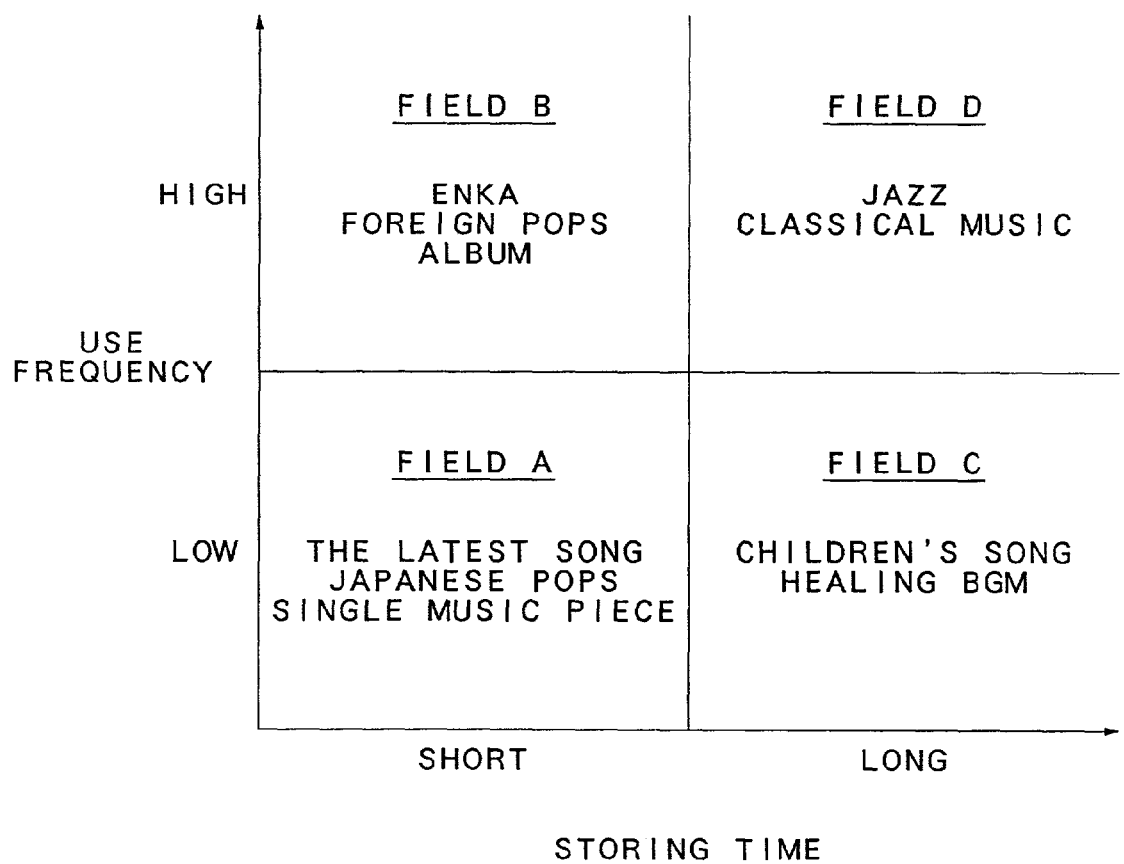
FIG. 15 is an explanatory diagram of a conversion table for converting a user use form into a use frequency and a storing time.
FIG. 16 is an explanatory diagram of a two-dimensional coordinate space of the use frequency and the storing time.

The process of the providing form analyzing server 70 provided for the server machine 10 in FIG. 4 will now be described. When the combination of the goods and article by the WWW server 60 is displayed as an ordering picture plane to the client machine 12 in a form such that they can be selected, the providing form analyzing server 70 analyzes the optimum providing form with respect to the selected article, sets the analyzed providing form as default information onto the ordering picture plane, and presents it to the user of the client machine 12. Such an analysis to obtain the optimum providing form can be performed by using the user information 74 set in the providing form analyzing database 72. The user information 74 can be formed from, for example, questionnaire information as shown in FIG. 13. The questionnaire information is shown with respect to the music distribution as an example and mainly classified as questionnaire items into a use environment and desired music. The use environment is classified into "during commuting", "during driving", "spare time at home", "during work", and "others" as shown in the details. The desired music is classified into "the latest song", "Japanese pops", "Enka (Japanese traditional love songs)", "foreign pops", "jazz", "classical music", "healing BGM", and "others" in accordance with the music piece and genre. In this case, the user has selected "during commuting" as a use environment and selected "Japanese pops" and "foreign pops" as a desired music. On the basis of such user questionnaire information, for example, user information as shown in FIG. 14 is formed as user information 74 in the database in FIG. 4. That is, in response to a user ID "aaaa" which was answered by the questionnaire information in FIG. 13, "during commuting" is set as a use environment and "Japanese pops" and "foreign pops" are set as a desired music. In correspondence to such user information 74, a use environment conversion table as shown in FIG. 15 is provided for the providing form analyzing server 70 in FIG. 4. In the use environment conversion table, the relation between the use frequency and the storing time has been predetermined in correspondence to the details of the use environment of the questionnaire information in FIG. 13. For example, in "during commuting", the information is regarded as disposable information in which the use frequency is low and the storing time is short. The same shall also similarly apply to the case of "during driving". On the other hand, with respect to "spare time at home", the information is regarded as collection information in which the use frequency is high and the storing time is long. Further, in "during work", the information is regarded as information in which the storing time is long although the use frequency is low. Therefore, in the providing form analyzing server 70, if the user has selected the music CD from the client machine 12, "low" is obtained as a use frequency and "short" is obtained as a storing time from the user ID with reference to the user information 74 as shown in FIG. 14. Further, fields A, B, C, and D in the 2-dimensional coordinate space for the storing time T and use frequency U as shown in FIG. 16 have been defined in the providing form analyzing server 70. The field number can be obtained by referring to the 2-dimensional coordinate space by the storing time T and use frequency U. In case of "during commuting", since the use frequency U is "low" and the storing time T is "short", the field A can be obtained from the coordinate space in FIG. 16. If the field A can be obtained in this manner, in case of the field number A, the providing form of "only information" can be obtained with reference to a conversion table in FIG. 17 in which the correspondence relation between the field number and the providing form has been stored . In this case, therefore, the client machine 12 is allowed to display the ordering picture plane, as a default recommended picture plane, in which the providing form corresponding to "only information" has been selected and set with respect to, for example, the check box of only the music piece data and the check box of "immediately download" on the CD ordering picture plane 110 in FIG. 9. If the user information 74 as shown in FIG. 14 does not exist, on the other hand, the providing form information 76 which has been prepared with regard to the sales article is used.

FIG. 18 is an explanatory diagram of the providing form information 76 stored in the providing form analyzing database 72 in FIG. 4. For example, music distribution is used as providing form information 76. As items, the providing form information 76 is constructed by: a music piece genre; a classification of information; a use frequency; a storing time; a field No.; a providing form; and a storage of use form. The latest songs, Japanese pops, and the like have been stored in the music piece genre. As a statistical result, the information has previously been classified in a manner such that the latest song is "disposable", the Japanese pops are "repeatable", Enka is "repeatable, and the like. Further, the use frequency and storing time which had statistically obtained with respect to each music piece genre have been set. In addition, the field numbers obtained with reference to the coordinate space in FIG. 16 are registered. Further, the providing forms corresponding to the field numbers obtained from the conversion table in FIG. 17 have been registered. History information of the providing form at the time when the user finally purchased has been stored in the last item "storage of use form". Specifically speaking, the number of times of the providing form purchased by the user is prepared as each count value CA, CB, CC, or CD every field A, B, C, or D, and the value of each counter is updated each time the order is decided. With reference to the count values CA to CD in the storage of use form every period, the providing form is updated to the providing form of the field number corresponding to the count value indicative of the maximum number of times.

Figure 19:
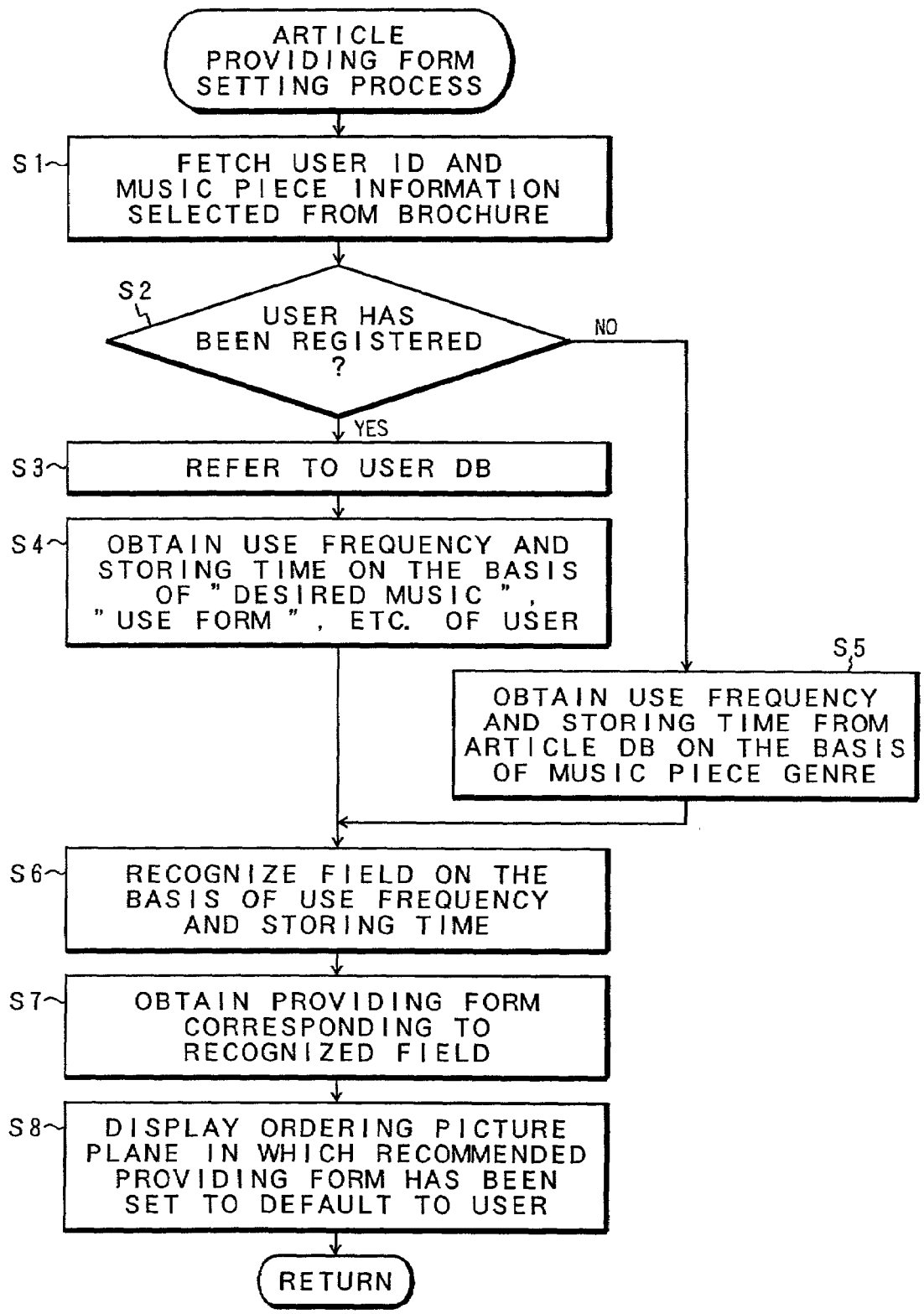
FIG. 19 is a flowchart for an automatic setting process of an article providing form in FIG. 12.

FIG. 19 is a flowchart for the process by the providing form analyzing server 70 in FIG. 4 and relates to a subroutine showing the details of the automatic setting process of the article providing form shown in step S4 in FIG. 12. First, in step S1, the user ID and music piece information selected from the brochure by the user are fetched. Subsequently, in step S2, the presence or absence of the user registration is discriminated. If there is the user registration, the user information in the database is referred to in step S3. The use frequency and the storing time are obtained on the basis of the desired music of the user, the use form, and the like in step S4. If there is no user registration in step S2, the use frequency and the storing time are obtained with reference to the providing form information 76 in FIG. 18 by the music piece genre in step S5. In step S6, the field in the 2-dimensional coordinate space as shown in FIG. 16 is recognized from the use frequency and the storing time. The providing form corresponding to the recognized field is obtained in step S7. The ordering picture plane in which such a recommended providing form has been set as a default is presented to the user. The processing routine is returned to the main routine in FIG. 12. Naturally, in the invention, the purchase articles separated into the goods and information can be also selected on the user side without performing the setting process of the article providing form as shown in FIG. 19. The automatic setting of the article providing form can be also performed upon reception of a setting request of the providing form from the user.

Subsequently, an explanation will now be made with respect to a recording medium in which the electronic commerce program which is installed into the server for performing the electronic commerce that is provided by the invention has been stored. The electronic commerce program of the invention is stored in a portable storage medium such as CD-ROM, floppy disk, or the like, installed in a state where it has been set into the CD-ROM driver 38 or floppy disk driver 36 in the server machine 10 having the hardware construction in FIG. 3, stored into the hard disk drive 48, developed therefrom into the RAM 32 as a main storage, and executed by the CPU 28, thereby realizing the function of the electronic commerce which provides the time difference service and/or the separation service by separating the article into the goods and information. The electronic commerce program of the invention can be also recorded into a recording medium of another apparatus which is connected through a network, downloaded and obtained by using a communication control apparatus, and stored into an auxiliary storing apparatus or a main storing apparatus of the self apparatus.

The electronic commerce program of the invention fundamentally comprises:

an order receiving step which separates a sales article into information and goods and presents them to the client in a form such that they can be selected; and an article providing step which selects the separated information, the separated goods, or a combination thereof on the basis of an ordering request from the client and provides it to the client.

As mentioned above, according to the invention, the sales article is separated into the goods and information, in addition to the transaction of the sole goods and the transaction of the sole information, the goods and the information are combined and provided to the consumer in a form such that they can be selected. Thus, an advantage of each of the goods and the information is utilized, purchase will of the consumer is raised, a ratio in the electronic commerce to the ordinary sales market is remarkably improved by the combination of the goods and information by which a new additional value is produced, and an active market of the electronic commerce can be established.

The invention is not limited to the above embodiment but incorporates many proper modifications without losing the objects and advantages of the invention. The invention is not limited by the numerical values shown in the embodiment.

What is claimed is:

1. An electronic commerce method of a server for performing a commerce with a client by using a network, comprising:
    separating a sales article into information and goods and presenting them to the client in a providing form such that they can be selected;
    selecting the separated information, the separated goods, or a combination thereof of the separated information and the separated goods on the basis of an ordering request from the client;
    obtaining a use frequency and a storing time of the article to be ordered, analyzing the obtained use frequency and a storing time of the article and setting said providing form based on the analysis; and
    displaying the set providing form as a default providing farm.

2. A method according to claim 1, wherein in a time difference service such that after the separated information was precedently provided, the separated goods are provided is executed.

3. A method according to claim 1, wherein a separation service such that the separated information and the separated goods are respectively solely provided is executed.

4. A method according to claim 1, wherein said sales article is a packaged music recording medium,
    in said separating, said packaged music recording medium is separated into recorded music piece data, a package, music, and the recording medium itself and presented, and
    in said selecting, the packaged music recording medium, the music piece data, a medium casing, the music, the recording medium, or a combination thereof is selected and provided to said client.

5. A method according to claim 1, wherein in said obtaining, when the use frequency of the article is low and the storing time is short, a providing form of only the information is set.

6. A method according to claim 1, wherein in said obtaining, when the use frequency of the article is high and the storing time is long, a providing farm of the goods themselves is set.

7. A method according to claim 1, wherein in said obtaining, when the use frequency of the article is high and the storing time is short, a providing form of a combination of the information and the goods is set.

8. A method according to claim 1, wherein in said obtaining, when the storing time is long although the use frequency of the article is low, a providing form of a combination of the information and the goods or a providing form of the goods themselves is set.

9. A method according to claim 1, wherein in said obtaining, the use frequency and the storing time for the article ordered by said client are obtained with reference to a database of user information in which use environments, tastes, and the like have previously been registered.

10. A method according to claim 1, wherein in said obtaining, the use frequency and the storing time for the article ordered by said client are obtained with reference to a database in which a use frequency and a storing time have previously been registered in correspondence to an attribute of the sales article.

11. A recording medium in which an electronic commerce program which is executed by a computer constructing a server for performing electronic commerce with a client by using a network has been recorded, wherein said program comprises:
    separating a sales article into information and goods and presenting them to the client in a providing form such that they can be selected;
    selecting the separated information, the separated goods, or a combination thereof of the separated information and the separated goods on the basis of an ordering request from the client;
    obtaining a use frequency and a storing time of the article to be ordered, analyzing the obtained use frequency and a storing time of the article and setting said providing form based on the analysis; and
    displaying the set providing form as a default providing farm.

12. A server for performing electronic commerce with a client by using a network, comprising:
    an order receiving unit which separates a sales article into information and goods and presents them to the client in a providing form such that they can be selected;
    an article providing unit selecting the separated information, the separated goods, or a combination thereof of the separated information and the separated goods on the basis of an ordering request from the client;
    a providing form analyzing unit obtaining a use frequency and a storing time of the article to be ordered, analyzing the obtained use frequency and a storing time of the article and setting said providing form based on the analysis; and
    displaying the set providing form as a default providing farm.

* * * * *

UNITED STATES PATENT AND TRADEMARK OFFICE
CERTIFICATE OF CORRECTION

PATENT NO. : 7,092,900 B2
APPLICATION NO. : 09/800890
DATED : August 15, 2006
INVENTOR(S) : Takashi Yamane et al.

It is certified that error appears in the above-identified patent and that said Letters Patent is hereby corrected as shown below:

Title Page Column 2 (other Publications), change "trends;" to --trends";--.

Column 13, Line 51, change "farm" to --form--.

Signed and Sealed this

Thirteenth Day of March, 2007

JON W. DUDAS
*Director of the United States Patent and Trademark Office*